Patented May 10, 1938

2,116,623

UNITED STATES PATENT OFFICE 2,116,623

GLASS BATCH

Francis C. Flint, Zanesville, Ohio, assignor to Hazel-Atlas Glass Company, Wheeling, W. Va., a corporation of West Virginia No Drawing. Application February 19, 1936, Serial No. 64,779

1 Claim. (Cl. 106—36.1)

The invention relates to compositions for making glass, and one of the objects of the invention is to provide a glass batch which will produce glass having an appearance of unusual brilliance and cleanliness.

Another object of the invention is to provide a batch in which certain constituents have been so accurately regulated that no carbon remains in the finished glass, to dull the appearance.

A further object of the invention is to provide a batch in which there is no extra sulphate to reduce the effect of the selenium, manganese or other decolorizer, or to produce seeds, gall or stones.

Various other objects and advantages of the invention will be apparent to those skilled in the art, from the following detailed description.

It is old and well known in the glass art to employ carbon, or coal, in glass batches as a reducing agent. Prior to the present invention, however, the amount of carbon has not been accurately regulated to produce glass of the best appearance.

Carbon is used for the purpose of reducing the sulphate, such as sodium sulphate, barium sulphate or any of the alkaline earths, to a form which will allow the base to which the sulphate is attached to be reduced to a lower form, sulphide or sulphite. Such compounds, being weaker acids than the sulphate, are more easily displaced by the silica, which itself is not a strong acid.

While it has been the common practice to employ carbon, or coal, in glass batches, yet the amount of carbon or coal so employed has never been accurately regulated, in fact the practice has been quite the contrary, an excess of carbon being employed for fear there would not be sufficient carbon. If there is not sufficient carbon, and sulphate remains, either the base would not react with the silica, thereby producing stones, or in reacting would allow the alkaline earth to combine with the silica and the sulphate, which, combined with the alkali in the batch, would rise to the top as salt water or gall. The reason for the prior practice of using an excess of carbon is therefore clear; but this excess of carbon in the batch dulls the appearance of the glass.

I have discovered that all of these objectionable conditions are overcome and a very fine grade of glass, of unusual brilliance, is produced when the amount of carbon added to the batch is accurately regulated, so that there will be neither an excess nor a deficiency of carbon. And I have also discovered that in order to provide a batch in which there is neither excess nor deficiency of carbon, it is necessary to determine and to take into account the amount of carbonaceous material which is naturally present in the batch in the form of dust, dirt, wood, paper, oil on the cullet, etc.

In accordance with the present invention I first accurately determine the percentage of carbon which is naturally present in the batch, in the form of dust, dirt, etc., and including the amount of carbon present in any cullet which is used. Having determined the amount of carbon which is naturally present in the batch, I then add just sufficient carbon to bring the total carbon percentage up to the exact amount required to reduce the barium sulphate, sodium sulphate or other sulphate, without any excess or deficiency of carbon. The amount of carbon naturally present in the batch is not sufficient to produce glass of the desired brilliance, and the best results are produced, as I have discovered, when the amount of carbon naturally present is first determined, and then the exact amount of additional carbon required is added.

In the prior practice no attempt has been made to determine the amount of carbon naturally present in the batch, and taking that into account in determining the amount of carbon to be added. On the contrary, the prior practice has been more or less haphazard, merely adding such amounts of carbon as will assure the complete reduction of the sulphate, and to be entirely sure of this it has been the practice to add more carbon than would actually seem necessary. In other words, it was preferred to have too much rather than too little carbon.

However, as mentioned hereinbefore, the best grade of glass is not produced if there is either an excess or a deficiency of carbon in the batch. An excess of carbon dulls the appearance of the glass, and if there is a deficiency of carbon some of the sulphate is not reduced and this excess sulphate lessens the effect of the selenium or manganese decolorizer, or produces seed, gall or stones.

Further, it is not possible to provide a glass batch having just the correct amount of carbon, without determining and taking into account the percentage of carbon which is naturally present in the batch, in the form of dust, dirt, etc. By first determining the amount of carbon naturally present and then adding the necessary further amount of carbon, I am able for the first time, as far as I know, to provide a batch with the exact amount of carbon to completely reduce the barium sulphate, sodium sulphate, or other sulphate, and without any excess carbon remaining, thereby overcoming the previous difficulties which as mentioned hereinbefore resulted either from the use of too much carbon, which caused carbon to remain in the glass, with its attendant difficulties, or too little carbon which caused sulphate to remain in the glass, with its attendant difficulties. Glass produced in accordance with the present invention will have an appearance of unusual brilliance and cleanliness.

The following formulas, one with sodium sulphate and the other with barium sulphate, are given merely as examples:

| | |
|---|---|
| Sand | 1000# |
| Soda | 360 |
| Burned lime | 110 |
| Cobalt | q. s. |
| Selenium | q. s. |
| Arsenic | 2 |
| Sodium sulphate | 30 |
| Carbon by analysis | 0.41 |
| Carbon added | 0.86 |

| | |
|---|---|
| Sand | 1000# |
| Soda | 370 |
| Burned lime | 110 |
| Cobalt | q. s. |
| Selenium | q. s. |
| Arsenic | 2 |
| Barium sulphate | 23 |
| Carbon by analysis | 0.35 |
| Carbon added | 0.24 |

Wherever the word "carbon" is employed, either in the specification or claim, it is intended to include coal.

Having fully described my invention, what I claim is:

The method of preparing glass batches for clear transparent glass which includes first determining the amount of carbon naturally present in the batch as dirt, dust, etc., and then adding carbon in an amount sufficient to bring the total carbon to the percentage desired.

FRANCIS C. FLINT.